United States Patent [19]

Jordan, deceased et al.

[11] Patent Number: 5,256,389
[45] Date of Patent: Oct. 26, 1993

[54] HIGH SURFACE AREA METAL OXIDE FOAMS

[75] Inventors: Merrill Jordan, deceased, late of Walpole, by Marion Jordan, executrix; Steven R. Reznek, Wellesley; Matthew Neville, Boston, all of Mass.; Brian A. Soucy, Hudson, N.H.; Bruce E. Mackay, Framingham, Mass.

[73] Assignee: Cabot Corporation, Boston, Mass.

[21] Appl. No.: 704,918

[22] Filed: May 22, 1991

Related U.S. Application Data

[60] Continuation of Ser. No. 493,401, Mar. 14, 1990, abandoned, which is a division of Ser. No. 164,555, Mar. 7, 1988, Pat. No. 4,937,062.

[51] Int. Cl.$^5$ ............................................. C01B 13/18
[52] U.S. Cl. .................................. 423/592; 423/625; 423/628; 423/600; 423/127; 502/355
[58] Field of Search ............... 423/628, 625, 127, 600, 423/592; 502/355

[56] References Cited

U.S. PATENT DOCUMENTS

| | | | |
|---|---|---|---|
| 3,161,468 | 12/1964 | Walsh | 423/335 |
| 3,172,753 | 3/1965 | Walsh | 75/363 |
| 3,273,962 | 9/1966 | Walsh | 423/592 |
| 4,266,978 | 5/1981 | Prochazka | 423/593 |
| 4,275,052 | 6/1981 | Ryu | 423/628 |
| 4,276,201 | 6/1981 | Sawyer | 252/455 R |
| 4,279,779 | 7/1981 | Sanchez | 252/448 |
| 4,301,037 | 11/1981 | Sanchez et al. | 252/462 |
| 4,511,455 | 4/1985 | Dosch et al. | 208/210 |
| 4,532,121 | 7/1985 | Bachelard et al. | 423/600 |
| 4,624,938 | 11/1986 | Kemp | 502/208 |
| 4,812,424 | 3/1989 | Helferich et al. | 423/181 |
| 4,814,300 | 3/1989 | Helferich | 423/181 |
| 4,842,832 | 6/1989 | Inoue et al. | 423/21.1 |
| 4,871,495 | 10/1989 | Helferich et al. | 501/84 |
| 4,878,947 | 11/1989 | Helferich | 501/80 |

OTHER PUBLICATIONS

Nielsen et al., "Ultrafine Metal Oxides by Decomposition of Salts in a Flame", Ultrafine Particles, 1963, pp. 181-195.

Primary Examiner—Theodore Morris
Assistant Examiner—Edward Squillante
Attorney, Agent, or Firm—David J. Koris

[57] ABSTRACT

The present invention includes metal oxide foam particles and a method of making the same. A decomposable metal salt feed solution is injected into a hot atomizing gas. The mixture of hot atomizing gas and feed solution is maintained in the reactor until the feed solution converts to metal oxide foam particles. The metal oxide foam particles have a high specific surface area.

6 Claims, 8 Drawing Sheets

3 MICRONS

HIGH SURFACE AREA METAL OXIDE FOAMS

This application is a continuation of U.S. Ser. No. 07/493,401, filed on Mar. 14, 1990 and now abandoned, whereby U.S. Ser. No. 07/493,401 is a division of U.S. Ser. No. 07/164,555, filed Mar. 7, 1988, and now U.S. Pat. No. 4,937,062.

FIELD OF INVENTION

The present invention relates to metal oxide particles and a method of making the same and, more particularly, relates to metal oxide foam particles and a high temperature process for making the same.

BACKGROUND OF THE INVENTION

High surface area metal oxide particles are well known in the art. Conventionally they are precipitated from either a liquid or a gas phase. In the usual liquid phase embodiments, the acidity, temperature or concentration of the metal salt solution is varied to precipitate the metal oxide or hydroxide. Typical of that prior art process is the neutralization of an acid solution of aluminum nitrate or titanium chloride with sodium hydroxide. In the usual gaseous phase embodiment, a metal salt is evaporated and then hydrolyzed by steam or oxygen to precipitate the metal oxide. Representative of that prior art method are the formation of fumed silica from vaporized silicon tetrachloride and fumed alumina from vaporized aluminum chloride. In both the usual liquid and gas phase precipitations the particles formed can be quite fine and have quite large specific surface areas; however, these powders do not possess an internal foam structure.

The decomposition or hydrolyzation of metal salts in high temperature gas streams is common in the art. In the usual approach, known as the spray dryer technique, a slurry or solution of a decomposable salt is atomized into a gas. The particles so formed can be relatively large, hollow spheres. The spheres often contain holes where the residual water or decomposition gases have escaped from the interior of the particle. The hollow spheres formed under these conditions do not have high specific surface areas.

A method for high temperature hydrolysis of a metal salt solution is disclosed by Walsh in U.S. Pat. No. 3,273,962 and in an article entitled, "Ultrafine Metal Oxides By Decomposition of Salts in a Flame," *Ultrafine Particles* (Wiley & Sons, 1963). Two related U.S. Pat. Nos. 3,172,753 and 3,161,468, further describe Walsh's method. In this method, which Walsh terms "atomizing into a flame," a two fluid atomizing nozzle is used to form a cloud of solution droplets in a plume of gas. This plume may contain, or is subsequently combined with, the fuel and oxidizing gas for a flame. Subsequent to creation of the droplets, a pilot flame initiates combustion. When combustion occurs, the fuel gases are burned to provide heat and thus permit decomposition of the metal salts.

Walsh teaches the use of cool gases in a two fluid nozzle to atomize the solution with the heating occurring in the later combustion process. Two aspects of Walsh's method retard the rate at which the droplets are heated. Since the droplets are in a plume of the cool atomizing gas, they are to some extent insulated. Alternatively, if the atomizing gas is either fuel or oxidant for the flame, the droplet's evaporation will cool the gas, prolonging the time needed for the gas to reach ignition temperature, burn and release heat.

Walsh emphasizes that the processing temperature must remain below 1150° C. in order to achieve hollow shelled particles. According to Walsh, when the reaction temperatures exceed 1150° C. only thin platelets or wall segments remain. This occurs because the initial droplet heating is not sufficiently rapid in the Walsh method.

The Walsh method does not result in the formation of high surface area particles. The largest specific surface area taught by Walsh for alumina hollow shells is 24 square meters per gram and for titania is 10 square meters per gram. Walsh discloses the formation of zirconia but indicates that the particles will occur as flakes rather than as hollow spheres.

A Pennsylvania State University thesis by Renato Ciminelli entitled "Synthesis of Alumina from Al $(NO_3)_3$ .$9H_2O$ by the Evaporative Decomposition of Solution Process" examines the question of the decomposition of aluminum nitrate in a high temperature atmosphere. Ciminelli used an atomizing nozzle to spray aluminum nitrate solution into a furnace heated ceramic tube. Ciminelli found that aluminum nitrate droplets converted to aluminum oxide particles, with a hollow sphere or foam structure, when the temperature of the outside of the ceramic tube, midway along its length, was in a range from 700° C. to 1000° C. The formation of hollow spheres according to Ciminelli's method depends upon heat being added to the mixture of gas and droplets.

In Ciminelli's method, the solution droplets are heated relatively slowly. This occurs because the aluminum salt droplets first experience low temperature gases from the bifluid nozzle and the mixing between the spray plume and the hot furnace gas is slow. Further, the heat required to raise the temperature by the final 200° C. to 400° C. was conducted through the walls of the ceramic tube. Under these conditions, Ciminelli was unable to make alumina particles with surface area greater than 43 square meters per gram. Ciminelli also calcined the particles made in his apparatus. By further heat treating the alumina particles at 950° C. he was subsequently able to raise their surface area to 77 square meters per gram. Specific surface area decreased drastically when higher calcining temperatures were encountered.

SUMMARY OF THE INVENTION

The present invention includes metal oxide foam particles and a method of making the same. A solution or slurry of decomposable salt solution is introduced into a high temperature and high kinetic energy gas. The solution is kinetically atomized by the gas into fine droplets. The high temperature and high kinetic energy of the gas ensure that the solution is atomized and heated extremely rapidly. The droplets formed thereby evaporate leaving a viscous dehydrated salt which decomposes into an oxide particle. The interior of the oxide particles consist of thin walls bounding hollow cells or pores; that combination of walls and cells/pores being referred to throughout the specification and claims as a foam structure. The oxide foam particles of the present invention have a large specific surface area.

Accordingly, it is a primary object of the present invention to provide a high temperature process for forming metal oxide foam particles with a high specific surface area.

I is another object of the present invention to provide a simple, inexpensive method of making high specific surface area metal oxide foam particles.

It is a still further object of the present invention to provide a process for producing metal oxide foam particles having a high specific surface area without requiring calcina ion.

BRIEF DESCRIPTION OF THE DRAWING

These and other details and advantages of the invention will be described in connection with the accompanying drawing in which.

DESCRIPTION OF THE PREFERRED EMBODIMENT

The present invention of making high surface area metal oxide foam particles comprises the steps of atomizing a solution of a decomposable metal salt with a high temperature and high kinetic energy gas and then maintaining the salt droplets formed thereby in the high temperature gas until the droplets dehydrate, foam and solidify as metal oxide particles. From the outset, the method requires rapid heating of the atomized solution. This rapid heating is achieved by initially contacting the solution with a high temperature atomizing gas, by ensuring that the droplets are small through kinetic atomization, and by ensuring a large initial velocity difference between the droplets and the hot gas.

Figure 1:
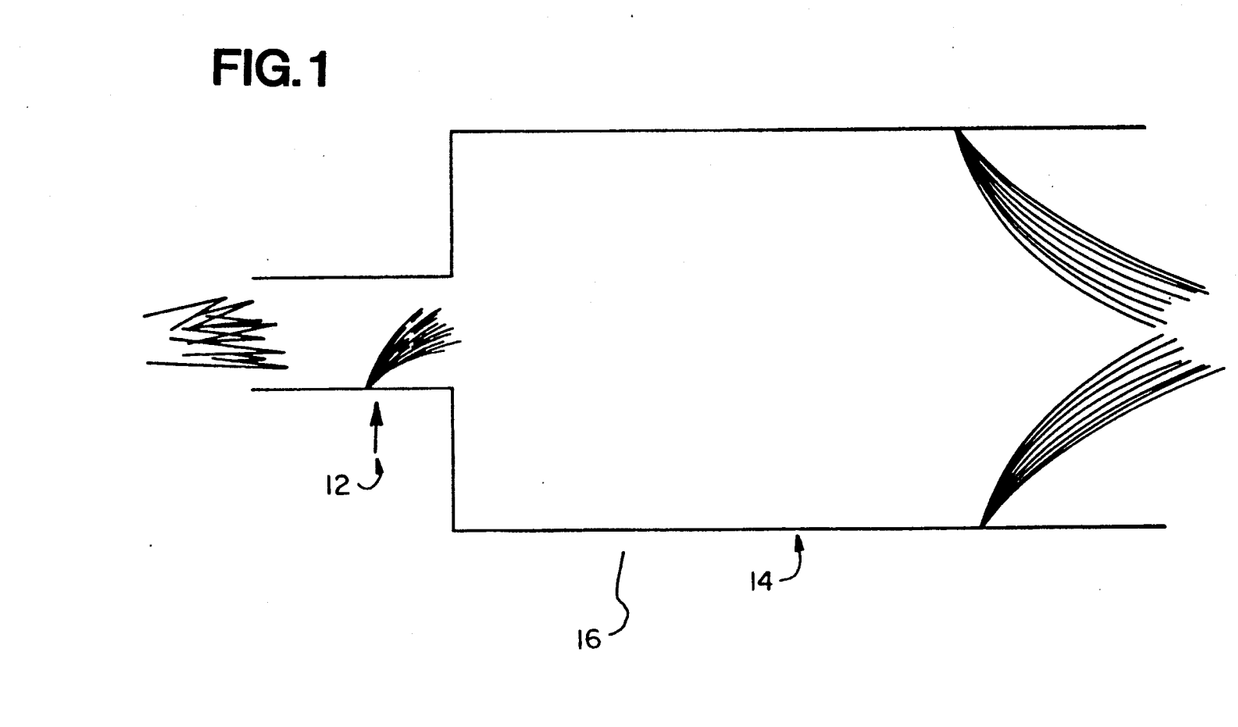
FIG. 1 is a schematic view of the method of forming metal oxide foam particles according to the preferred embodiment of the invention.

In the preferred embodiment, as shown in FIG. 1, fine droplets of the metal salt feed solution are created by kinetically atomizing the metal salt feed solution with a high Mach number and high temperature gas. If the metal salt feed solution is introduced into the high Mach number gas as a coherent stream of liquid or as large drops, the high shear and turbulence of the high Mach number gas atomizes the metal salt feed solution into fine droplets. The gas, which may be created by combustion of a fuel or by a plasma arc, has a Mach number at the time of introduction of the metal salt feed solution of at least Mach. 0.2. In the examples which follow, the high Mach number gas is formed by burning natural gas with either air or oxygen-nitrogen mixtures. The temperature of the atomizing gas as the feed solution is injected therein is at least 700° K. to ensure that the equilibrated temperature thereof after formation of the foam particles, that is, the temperature of the gas after atomization and decomposition without the application of additional heat through the furnace walls or otherwise, is at least 400° K. The salt which may include nitrates, sulfates, or chlorides and other readily hydrolyzeable salts of the metal, is first dissolved in a solvent of either water or alcohol. If chlorides are used, a portion of the metal in the solution should be in the form of an oxide or hydroxide complex rather than a simple ion. The metals include any metal that is oxidizable from a solution of its inorganic salts in a flame environment such as aluminum, titanium, zirconium, etc. For the purposes of the instant patent application, the term "solution" encompasses simple solutions, dispersions and slurries.

Subsequent to atomization in the burner section 12 of the reactor, the mixture of the hot atomizing gas and the droplets of metal salt feed solution passes into a reaction section 14 of the main reactor 16. In the larger reaction section 14, the water or other solvent evaporates, leaving a viscous salt that foams as the remaining water and salt decomposition gases vaporize. The high temperature of the atomizing gas, the rapid mixing between the droplets and the hot gas, and the high relative Mach number between the gas and the feed solution contribute to the high heating rate the atomized droplet experiences.

Preferably, all of the heat is added to the hot gas before the metal salt feed solution is injected. Any heat energy added to the gas after the droplets are formed will not be as effective in achieving a rapid increase of the particles temperature. Configurations where the metal salt feed solution contains a fuel and the hot atomizing gas is oxygen rich, or the metal salt feed solution contains an oxidizing agent and the hot atomizing gas is fuel rich, or where some of the heat is conducted to the reaction section from an outside source are less desirable. In such configurations, a higher temperature in the reaction section of the reactor will be required to achieve the same properties as particles made when all the heat is developed in the atomizing gas prior to contacting the metal salt feed solution.

Once the oxide particles are formed, the temperature of the particles and atomizing gas is lowered and the particles are collected. The temperature can be lowered rapidly by adding a quench fluid such as water or lowered slowly by conducting heat to the surroundings. The particles can be maintained at one or more intermediate temperatures for specified periods by adding the quenching fluid in more than one stage. After cooling to the appropriate temperature, the particles can be collected by conventional means such as fabric filters or cyclones.

Once the particles have been collected, they may contain a small amount of undecomposed salt; or they may contain the hydrated metal oxide or they may partially consist of the metal oxide in an amorphous phase. The particles can be calcined to complete the conversion of the salt to the oxide or to change the metal oxide phase. This calcination can be accomplished by any of the methods known in the art, e.g. fixed bed, fluidized bed or rotary furnaces.

In an alternative embodiment of the invention, the initial heat transfer rate between the droplets and the hot atomizing gas is promoted. In this embodiment the droplet plume and hot atomizing gas pass into a first stage reactor where they reside for a short time at high temperatures. Then a cooling fluid such as air or water is injected to lower the temperature in a second stage reactor where the particles reside for a longer period of time.

Figure 5A:
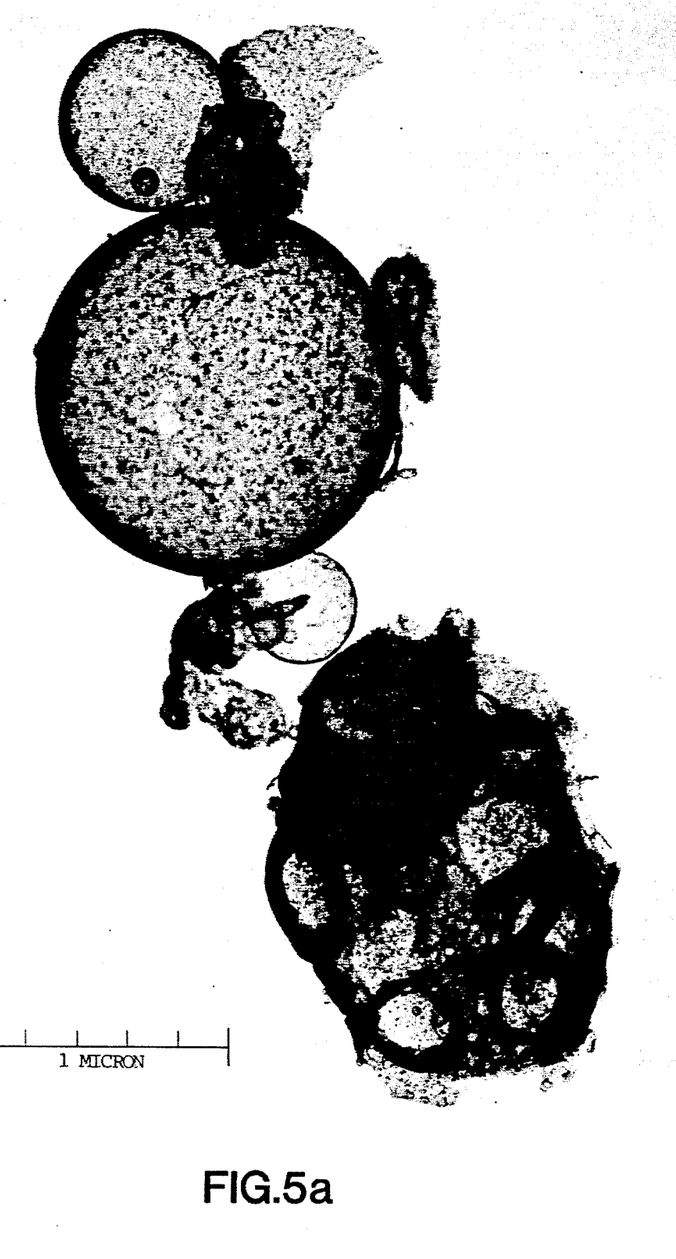
FIGS. 5a and 5b are a TEM and a SEM of foamed zirconia particles.
Figure 5B:
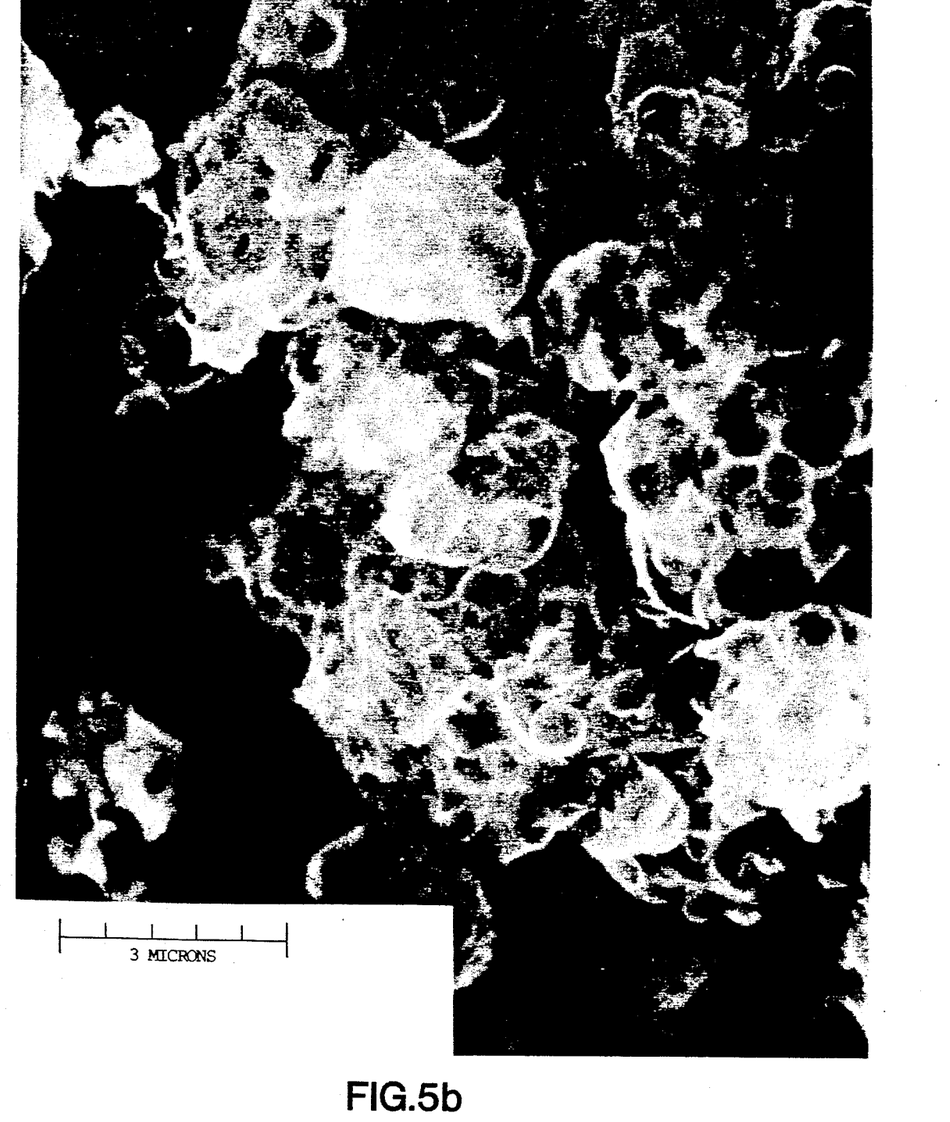

Referring to FIGS. 314 5, there are shown transmission electron and scanning electron micrographs of the metal oxide foam particles of alumina, titania and zirconia. The individual foam particles can be as small as 0.1 microns or as large as 30 microns. These metal oxide particles, have a high specific surface area and consist of thin walls bounding hollow cells or pores. The walls can be as thin as fifty angstroms; but more commonly are around 100 to 200 angstroms. The typical dimensions of the pore or cell is 0.1 micron, but may range from 0.01 micron to 2.0 microns. A typical particle will contain many such cells. A minority of the foam particles may be single hollow spheres. The high specific surface area foam particles of the present invention are useful in a number of applications, including catalyst supports, polymer fillers and abrasives.

In order to further illustrate the invention, the following examples are provided. It is to be understood, however, that the examples are included for illustrative purposes only and are not intended to limit the scope of the invention as set forth in the accompanying claims

EXAMPLES

Table 1 lists the operating conditions used in making foamed particles of aluminum, titanium and zirconium oxide. The temperature, mass flow rate and the Mach number of the atomizing gas, before the salt solution is injected, are listed. The mass flow rate and the salt concentration are listed for the solution. In these experiments, the solution injection nozzle created a coherent stream. The reactor had metal walls which were cooled. Therefore, the mixture of high kinetic and high temperature atomizing gas and particles was cooled as it passed through the reactor. The average temperature in the reaction section has been determined by dividing in half the sum of the temperature of the atomizing gas as it enters the reaction section and the temperature of the atomizing gas as it exits the reaction section. Surface area was determined by measuring the amount of nitrogen absorbed per gram of oxide at 77 degrees Kelvin and a pressure of 0.1 atmospheres. The samples were prepared by heating them in dry nitrogen to 125° C. for an hour. These "single point" surface measurements are not as accurate as a full BET measurements. However, they underestimate the true area and are reasonably accurate if the true area is less than about 50 square meter per gram.

oxygen needed to burn the fuel gas completely. In Example 6 some of the fuel remains unburned at the time the salt solution is introduced to the atomizing gas. The oxygen liberated when the nitrate is converted to $NO_2$ completely consumes the remaining fuel. The surface area of the foamed oxide, formed when all the fuel is burned prior to contacting the salt solution, is greater than that formed when a portion of the energy is released in the reaction section.

Example 7 shows that high surface area foamed alumina can be obtained when the Mach number of the hot gas is less than Mach 0.5. The flame must only have enough kinetic energy to atomize the solution; preferably the flame should have a Mach number greater than Mach 0,2.

The surface areas of Table 2 were measured using the complete B.E.T. method for nitrogen absorption at 77K. The samples were held at 350° C. in vacuum for at least twelve hours before the absorption was measured. This method gives an accurate measure of the surface area.

TABLE 2

| | BURNER | | | SALT | REACTION | | |
|---|---|---|---|---|---|---|---|
| EX. # | TEMP. (DEG. K) | MASS (GM/SEC) | OXYGEN % STOICH | MACH NUMBER | MASS (GM/SEC) | TEMP (DEG K) | RES. TIME (MSEC) | B.E.T. AREA (M2/GM) |
| 5 | 1930 | 68.61 | 310 | 0.82 | 12.49 | 1443 | 4.12 | 165.6 |
| 6 | 1438 | 73.30 | 84 | 0.91 | 12.49 | 1438 | 3.73 | 113.6 |
| 7 | 2453 | 22.65 | 163 | 0.49 | 6.58 | 1449 | 32.93 | 99.4 |

Figure 2:
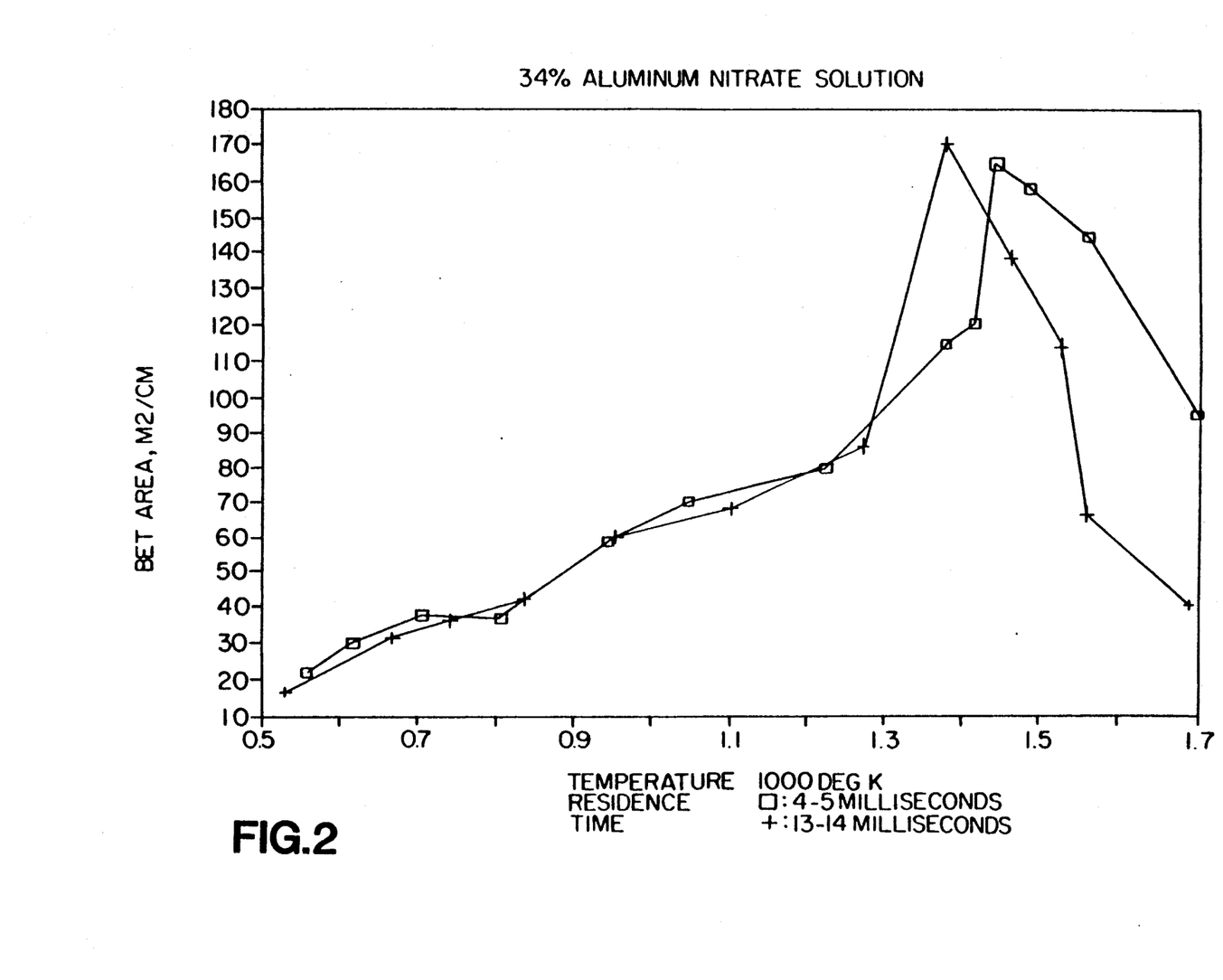
FIG. 2 is a graphic illustration of the effect of temperature and residence time on the specific surface area of metal oxide foam particles.
Figure 3A:
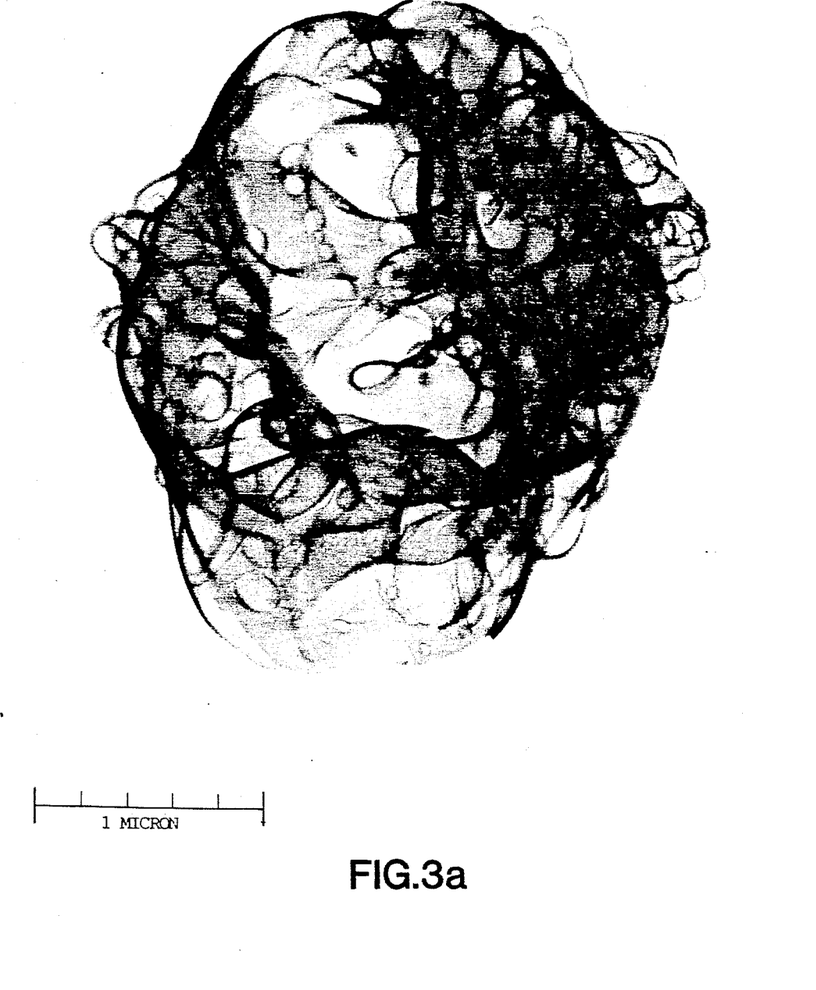
FIGS. 3a and 3b are a TEM and a SEM of gamma phase foamed alumina particles.
Figure 3B:
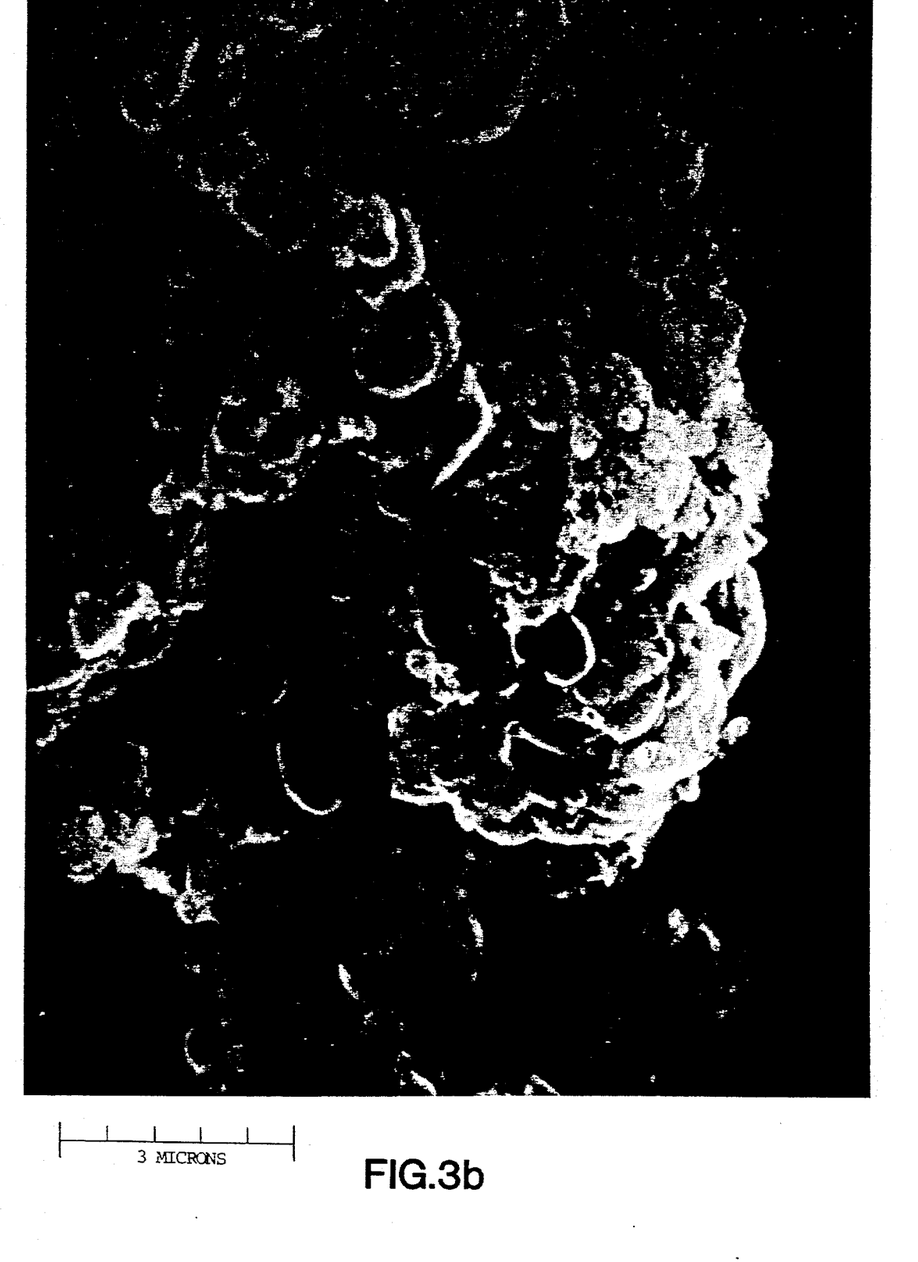
Figure 4A:
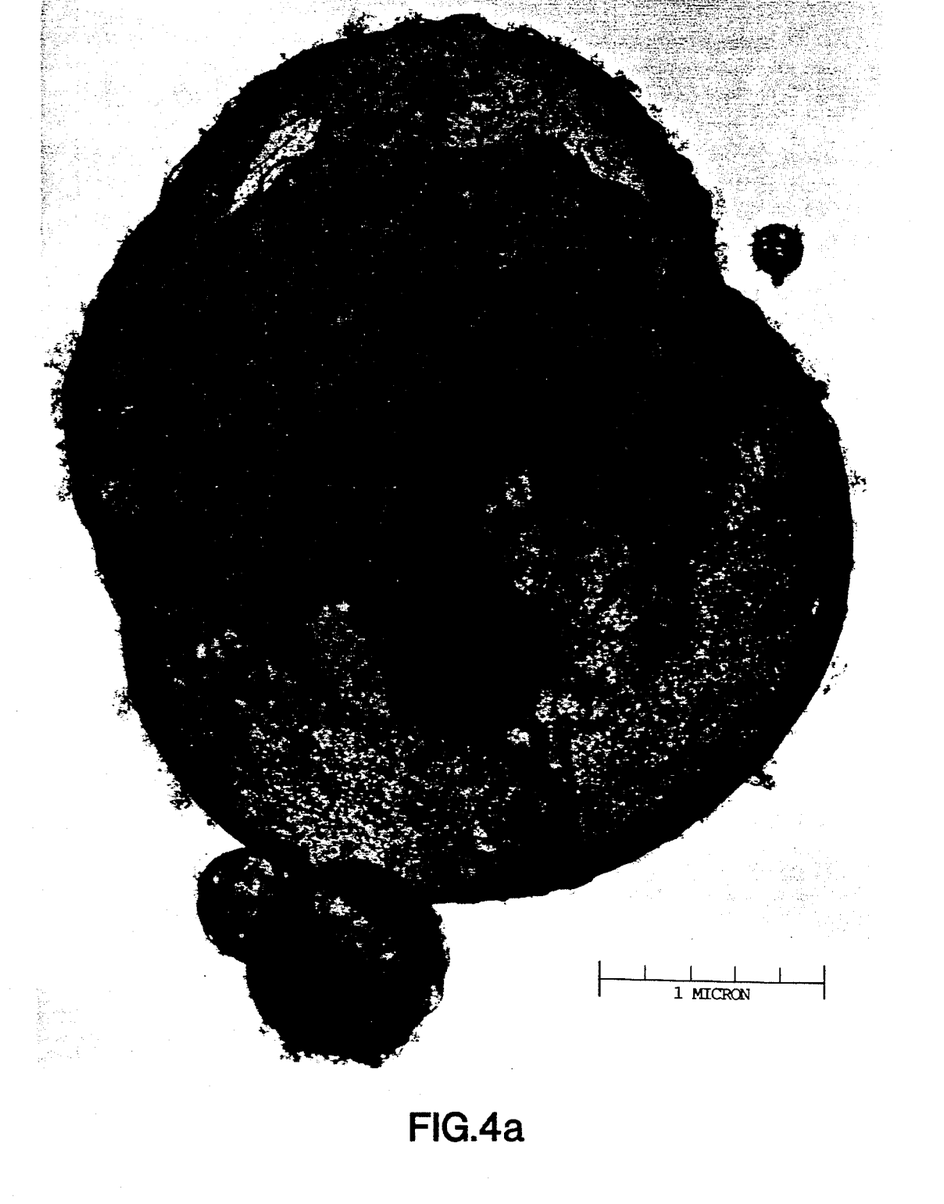
FIGS. 4a and 4b are a TEM and a SEM of foamed titania particles.
Figure 4B:
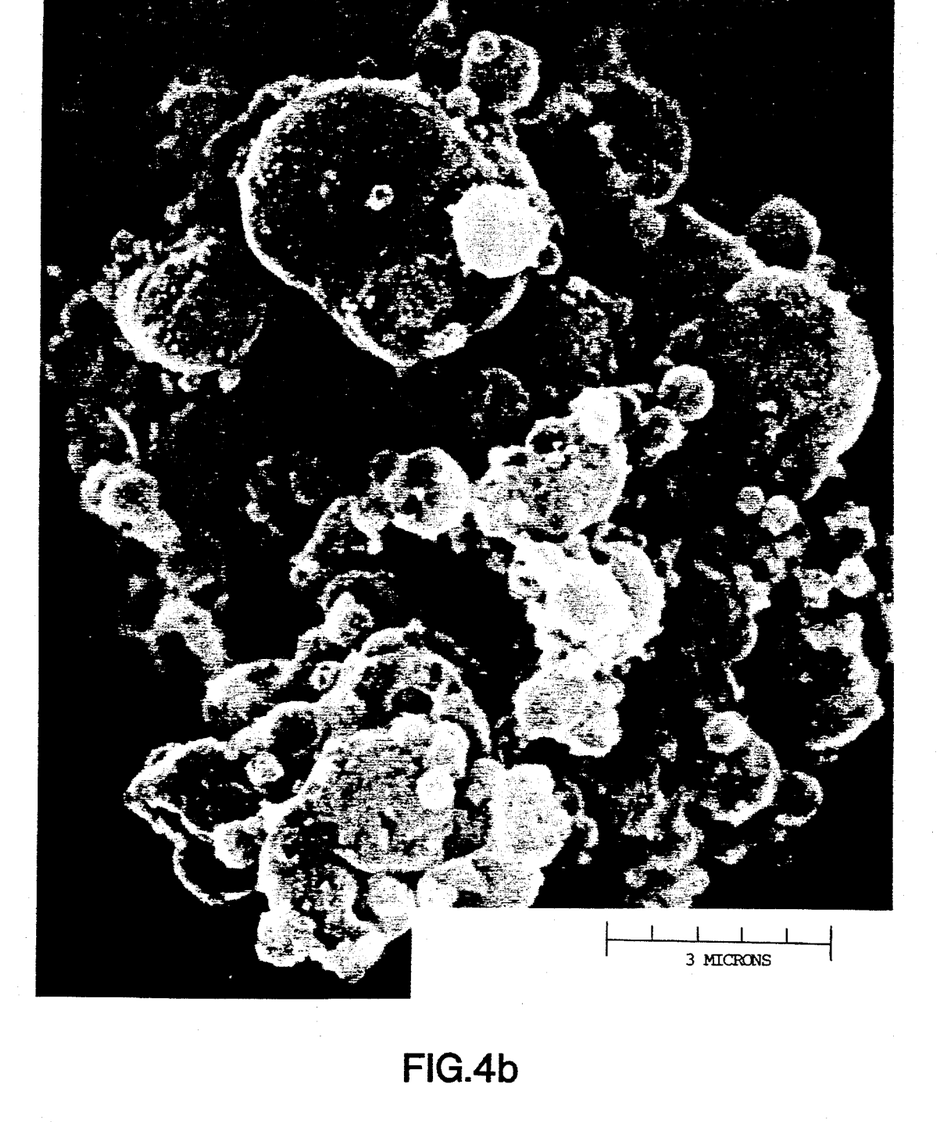

Two important process variables that affect the properties of foamed alumina made from nitrate salt solutions are the temperature of the atomizing gas and residence time in the reaction section. The process conditions and the product properties are shown in FIG. 2 and are listed in greater detail in Table 3.

The temperature of the atomizing gas in the reactor section has been calculated based on thermodynamic equilibrium. That temperature is determined after measuring 1) the energy content of the fuel, 2) the flow rates of fuel, oxygen and neutral gases, 3) the heat lost in the burner and reactor, and 4) the flow rates of the feed solution. The reactor is designed to minimize heat loss. Variations in the reaction section temperature may be achieved by varying the temperature of the atomizing gas in the burner section.

In the reaction section temperature range 500K (227°

TABLE 1

| EX. # | PRODUCT | FEED SOLUTION | BURNER | | | SALT MASS (GM/SEC) | REACTION | | | RES TIME (MSEC) | SINGLE-POINT SURFACE AREA (M2/GM) |
|---|---|---|---|---|---|---|---|---|---|---|---|
| | | | TEMP. (DEG. K) | MASS (GM/SEC) | MACH NUMBER | | TEMP IN (DEG K) | TEMP OUT (DEG K) | TEMP AVE (DEG K) | | |
| 1 | Al2O3 | AlCl3-30% WT | 2506 | 30.59 | 0.78 | 20.51 | 1342 | 967 | 1154 | 12.23 | 60.9 |
| 2 | Al2O3 | Al2(SO4)3-20% WT | 1661 | 47.92 | 0.98 | 4.77 | 1427 | 1374 | 1401 | 58.88 | 58.0 |
| 3 | TiO2 | TiCl4-11% WT | 1606 | 45.76 | 0.94 | 9.72 | 1195 | 869 | 1032 | 12.49 | 61.8 |
| 4 | ZrO2 | ZrO(NO3)2-38% WT | 2316 | 33.26 | 0.96 | 18.92 | 1140 | 1132 | 1286 | 10.93 | 14.1 |

Table 2 shows the operating conditions and surface areas of foamed alumina made from a 34 percent solution of aluminum nitrate. Examples 5 and 6 have the same average temperature in the reaction section. However, in Example 5 all the fuel was burned before the solution was injected into the atomizing gas. The oxygen stoichiometry is the ratio of the oxygen used to the C.) to 1200K (927° C.), the alumina foam has smooth walls which are amorphous, i.e. without specific crystalline phase. The surface area increases with temperature. At 500K (227° C.) the surface area is about 20 square meters per gram, and at 1200K (927° C.) it is about 75 square meters per gram. The greater the temperature of the atomizing gas, the more rigorous is the foaming and the thinner the walls of the foam. Within this temperature range, the surface area is not particularly dependent upon the reactor residence time.

If the temperature of the atomizing gas in the reaction section is raised above 1200K (927° C.), the surface area of the resulting particles increases sharply. At temperatures between 1300K (1,027° C.) and 1400K (1,127° C.), the powders can have surface areas greater than 100 square meters per gram and as high as 170 square meters per gram. Powders made at these temperatures consist, at least in part, of the transition phase of alumina (e.g. gamma phase). The surface of the foam walls are not smooth, but are made up on small crystallites. The walls contain voids or pores.

At temperatures in excess of 1400K (1,127° C.), the powder surface areas decrease with increasing temperatures. At the temperatures in excess 1600K (1,327° C.), the alpha phase of alumina can be present.

The surface area and phase composition of the alumina foams are strongly affected by residence time in the reaction section if the temperature is in excess of 1200K (927° C.). If the residence time is around 14 milliseconds, the sharp increase in surface area will occur at a temperature slightly higher than 1270K (1000° C.). If the residence time is around 4.5 milliseconds, the sudden increase occurs at temperatures slightly higher than 1400K (1130° C.). The longer the powders experience a temperature above 1450K (1175° C.), the lower its surface area will be. For example, at a temperature of 1550K (1,275° C.), if the particles reside in the reactor for 4 milliseconds they will have a surface area of 145 square meters per gram. However if they remain in the reactor for as long as 13 milliseconds, their surface area will be reduced to 70 square meters per gram.

Most of the surface areas of the example products shown in Table 3 were measured using the complete B.E.T. method. The samples were heated to 350° C. and held at least twelve hours under vacuum. A few low area examples of Table 3 were measured with the single point method.

Table 4 shows the burner and reaction section conditions as well as the surface area of alumina particles containing 2.4 percent strontium oxide. Strontium is a well-known additive for stabilizing high surface area aluminas against sintering. Other surface area stabilizers include barium oxide, zirconium oxide, cesium oxide, lanthanum oxide and mixtures thereof. Alumina foam particles preferably contain up to twenty percent strontium oxide. The highest surface area occurs at a reactor temperature of 1595° K (1322° C.). The surface areas in Table 4 are single-point measurements and therefore underestimate the true surface area.

TABLE 3

| EX. # | BURNER | | | SALT* | REACTION | | B.E.T. AREA (M2/GM) |
| | TEMP. (DEG. K) | MASS (GM/SEC) | MACH NUMBER | MASS (GM/SEC) | TEMP (DEG K) | RES. TIME (MSEC) | |
|---|---|---|---|---|---|---|---|
| 8 | 2207 | 65.17 | 0.80 | 12.49 | 1698 | 3.63 | 95.4 |
| 9 | 2059 | 67.71 | 0.81 | 12.49 | 1561 | 3.84 | 145.0 |
| 10 | 1970 | 68.84 | 0.82 | 12.49 | 1486 | 3.98 | 158.8 |
| 11 | 1930 | 68.61 | 0.82 | 12.49 | 1443 | 4.12 | 165.5 |
| 12 | 1892 | 70.94 | 0.80 | 12.49 | 1417 | 4.10 | 120.1 |
| 13 | 1844 | 71.68 | 0.79 | 12.49 | 1377 | 4.16 | 114.7 |
| 14 | 1631 | 76.21 | 0.83 | 12.49 | 1222 | 4.49 | 79.9 |
| 15 | 1397 | 81.42 | 0.84 | 12.49 | 1047 | 4.98 | 70.5 |
| 16 | 1256 | 86.72 | 0.86 | 12.49 | 946 | 5.21 | 58.8 |
| 17 | 1081 | 91.05 | 0.86 | 12.49 | 808 | 5.84 | 36.7 |
| 18 | 937 | 98.71 | 0.89 | 12.49 | 706 | 6.23 | 37.7** |
| 19 | 820 | 104.96 | 0.89 | 12.49 | 615 | 6.76 | 30.1** |
| 20 | 744 | 112.09 | 0.88 | 12.49 | 557 | 7.05 | 22.1** |
| 21 | 2205 | 65.22 | 0.79 | 12.49 | 1692 | 10.94 | 40.3 |
| 22 | 2053 | 68.35 | 0.81 | 12.49 | 1560 | 11.47 | 66.6 |
| 23 | 2014 | 69.38 | 0.80 | 12.49 | 1526 | 11.57 | 113.4 |
| 24 | 1938 | 70.21 | 0.81 | 12.49 | 1462 | 11.97 | 139.0 |
| 25 | 1843 | 71.04 | 0.82 | 12.49 | 1378 | 12.59 | 171.4 |
| 26 | 1695 | 75.31 | 0.83 | 12.49 | 1276 | 12.96 | 85.9 |
| 27 | 1466 | 80.45 | 0.85 | 12.49 | 1103 | 14.21 | 68.4 |
| 28 | 1262 | 86.52 | 0.87 | 12.49 | 953 | 15.46 | 60.4 |
| 29 | 1114 | 90.72 | 0.88 | 12.49 | 839 | 16.87 | 41.9** |
| 30 | 980 | 96.43 | 0.90 | 12.49 | 742 | 18.13 | 36.2** |
| 31 | 871 | 104.80 | 0.93 | 12.49 | 670 | 18.61 | 32.2** |
| 32 | 706 | 112.09 | 0.92 | 12.49 | 528 | 22.33 | 17.0** |

*34% WT. ALUMINUM NITRATE SOLUTION
**SINGLE-POINT SURFACE AREA MEASUREMENT

TABLE 4

| EX. # | BURNER | | | SALT* | REACTOR | | SURFACE AREA** (M2/GM) |
| | TEMP. (DEG. K) | MASS (GM/SEC) | MACH NUMBER | MASS (GM/SEC) | TEMP (DEG K) | RES. TIME (MSEC) | |
|---|---|---|---|---|---|---|---|
| 8 | 2252 | 58.08 | 0.84 | 1.66 | 1796 | 3.41 | 45.1 |
| 9 | 2196 | 55.78 | 0.84 | 1.66 | 1703 | 3.71 | 63.5 |
| 10 | 2123 | 53.30 | 0.84 | 1.66 | 1595 | 4.10 | 95.7 |
| 11 | 2004 | 56.47 | 0.85 | 1.66 | 1505 | 4.16 | 66.0 |
| 12 | 1921 | 54.95 | 0.86 | 1.66 | 1411 | 4.53 | 61.5 |

*SOLUTION COMPOSITION - 33.6% Al(NO3)3 & 0.4% SrNO3
**SINGLE-POINT MEASUREMENT

What is claimed is:

1. An individual uncalcined metal oxide foam particle having walls bounding hollow cells, wherein said walls have a thickness between about 50 to about 200 angstroms and a specific surface area greater than 45 m²/gram.

2. The individual alumina foam particle of claim 1 wherein said cells have a diameter between about 0.01 to about 2 microns, and said particle has a diameter between about 0.1 to about 30 microns.

3. The foam particles of claim 2 wherein said cells have a diameter of about 0.1 micron.

4. An individual uncalcined alumina foam particle having walls bounding hollow cells, wherein said walls have a thickness between about 50 to about 200 angstroms and a specific surface area greater than 45 m²/gram.

5. An individual metal oxide foam particle having walls bounding hollow cells, wherein said walls have a thickness between about 50 to about 200 angstroms and a specific surface area greater than 77 m²/gram.

6. An alumina foam particle having walls bounding hollow cells, wherein said walls have a thickness between about 50 to about 200 angstroms and a specific surface area greater than 77 m²/gram.

* * * * *